United States Patent [19]
Martin et al.

[11] Patent Number: 5,618,904
[45] Date of Patent: Apr. 8, 1997

[54] POLYURETHANE HOT MELT ADHESIVE

[75] Inventors: Brian Martin; Julie A. Muehlfeld, both of Midland, Mich.

[73] Assignee: Essex Specialty Products Inc., Clifton, N.J.

[21] Appl. No.: 174,968

[22] Filed: Dec. 29, 1993

[51] Int. Cl.$^6$ .......................... C09J 175/06; C09J 175/08; C08G 18/32

[52] U.S. Cl. ................... 528/73; 528/76; 528/77; 528/79; 528/80; 528/83; 528/85; 528/905

[58] Field of Search .......................... 528/73, 76, 77, 528/79, 905, 80, 83, 85

[56] References Cited

U.S. PATENT DOCUMENTS

| | | | |
|---|---|---|---|
| Re. 31,671 | 9/1984 | Bonk et al. | 528/65 |
| 3,016,364 | 1/1962 | Müller | 528/79 |
| 3,214,411 | 10/1965 | Saunders et al. | 528/67 |
| 3,240,842 | 3/1966 | Saunders | 528/61 |
| 3,335,191 | 8/1967 | Brack | 528/77 |
| 3,422,066 | 1/1969 | Britain | 528/59 |
| 3,686,140 | 8/1972 | Gruber et al. | 528/905 |
| 3,743,626 | 7/1973 | Emmons | 428/355 |
| 3,899,467 | 8/1975 | Bonk et al. | 528/76 |
| 3,901,852 | 8/1975 | Shah | 528/85 |
| 3,929,732 | 12/1975 | Shah | 528/85 |
| 3,963,679 | 6/1976 | Ulrich et al. | 528/45 |
| 3,984,607 | 10/1976 | Thoma et al. | 525/70 |
| 4,010,146 | 3/1977 | Russell et al. | 528/77 |
| 4,118,376 | 10/1978 | Pedain et al. | 528/59 |
| 4,124,572 | 11/1978 | Mao | 528/76 |
| 4,202,957 | 5/1980 | Bonk et al. | 528/77 |
| 4,371,684 | 2/1983 | Quiring et al. | 528/65 |
| 4,384,083 | 5/1983 | Baker | 156/332 |
| 4,471,102 | 9/1984 | Petschke | 528/49 |
| 4,485,719 | 12/1984 | Mendelsohn et al. | 528/66 |
| 4,608,418 | 8/1986 | Czerwinski et al. | 524/296 |
| 4,738,605 | 4/1988 | Aerts et al. | 425/98 |
| 4,756,785 | 7/1988 | König et al. | 528/44 |
| 4,855,382 | 8/1989 | Vanhaeren | 528/45 |
| 4,870,142 | 9/1989 | Czerwinski et al. | 525/528 |
| 4,871,590 | 10/1989 | Merz et al. | 524/606 |
| 4,879,365 | 11/1989 | Petschke et al. | 528/49 |
| 4,925,732 | 5/1990 | Driskill et al. | 428/336 |
| 4,980,445 | 12/1990 | van Der wal et al. | 528/76 |
| 4,985,535 | 1/1991 | Takada et al. | 528/272 |
| 5,021,534 | 6/1991 | Kawasaki et al. | 528/60 |
| 5,091,444 | 2/1992 | Bauer et al. | 524/590 |
| 5,115,073 | 5/1992 | Meckel et al. | 528/83 |
| 5,155,180 | 10/1992 | Takada et al. | 525/440 |
| 5,162,457 | 11/1992 | Hänsel et al. | 525/454 |
| 5,166,300 | 11/1992 | Rumon et al. | 528/65 |
| 5,166,302 | 11/1992 | Werner et al. | 528/67 |
| 5,173,538 | 12/1992 | Gilch et al. | 525/130 |
| 5,190,607 | 3/1993 | Werner et al. | 528/67 |
| 5,338,819 | 8/1994 | Narayan et al. | 528/60 |

OTHER PUBLICATIONS

Derwent Publications Ltd., 88–354699/50.
Derwent Publications Ltd., 87–314870/45.
Derwent Publications Ltd., 87–153281/22.
Derwent Publications Ltd., 86–273711/42.
Derwent Publications Ltd., 78–00231A/01.
Derwent Publications Ltd., 78–91704A/51.

*Primary Examiner*—Rabon Sergent
*Attorney, Agent, or Firm*—Ann Galbraith; Norman Sims

[57] ABSTRACT

Described herein is a one-part hot melt adhesive comprising the reaction product of: (a) a polyester polyol with an equivalent weight in the range of from about 250 to about 3,000; (b) a polyisocyanate; and (c) at least about 1 weight percent hydroquinone bis (2-hydroxyethyl) ether; wherein the isocyanate content of the resulting product is at least about 0.5 percent. Also described is a one-part hot melt adhesive comprising the reaction product of: (a) a polyether polyol; (b) a polyisocyanate; and (c) hydroquinone bis (2-hydroxyethyl) ether; wherein the isocyanate content of the resulting product is at least about 0.5 percent. It has been discovered that the compositions of the invention provide adhesives with increased resistance to softening at high temperatures (e.g., above about 70° C.) after curing. Such adhesives have a variety of uses in applications wherein the applied adhesive is exposed to high temperatures, but are particularly useful in automotive applications, wherein the exterior or interior of the automobile may be exposed to such temperatures.

15 Claims, No Drawings

POLYURETHANE HOT MELT ADHESIVE

BACKGROUND OF THE INVENTION

This invention relates to hot melt adhesive compositions and, more particularly, to hot melt adhesive compositions prepared from polyisocyanates and isocyanate-reactive compounds.

Hot melt adhesives are adhesives with a thermoplastic character, that is, they flow at an elevated temperature and are solid at a lower temperature. Such adhesives are well-known and are typically applied by extruding the heated adhesive between two articles to be bonded and then allowing the adhesive to cool. As the adhesive cools, it forms a more rigid bond between the articles. Such adhesives have certain advantages over two-part adhesives, which typically have lower initial green strengths and are more complex to apply.

SUMMARY OF THE INVENTION

In one aspect, this invention is a one-part hot melt adhesive comprising the reaction product of:
(a) a polyester polyol with an equivalent weight in the range of from about 250 to about 3,000;
(b) a polyisocyanate; and
(c) at least about 1 weight percent hydroquinone bis (2-hydroxyethyl) ether;
wherein the isocyanate content of the resulting product is at least about 0.5 percent.

In a second aspect, this invention is a one-part hot melt adhesive comprising the reaction product of:
(a) a polyether polyol with an equivalent weight in the range of from about 250 to about 3,000;
(b) a polyisocyanate; and
(c) at least about 1 weight percent hydroquinone bis (2-hydroxyethyl) ether;
wherein the isocyanate content of the resulting product is at least about 0.5 percent.

It has been discovered that the compositions of the first and second aspects of the invention provide adhesives with increased resistance to softening at high temperatures (e.g., above about 70° C.) after curing. Such adhesives have a variety of uses in applications wherein the applied adhesive is exposed to high temperatures, but is particularly useful in automotive applications, wherein the exterior or interior of the automobile may be exposed to such temperatures.

DETAILED DESCRIPTION OF THE INVENTION

Suitable polyester polyols for use in the first aspect of the invention include chain extended polyesters prepared from a glycol (such as ethylene or propylene glycol) and a saturated dicarboxylic acid (such as adipic acid), and polycaprolactone diols. Preferably, the polyester polyol is prepared from a glycol and a saturated dicarboxylic acid, such as may be prepared by reacting such glycols as 1,4-butanediol, 1,6-hexanediol, ethylene glycol, diethylene glycol, triethylene glycol, propylene glycol, dipropylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, neopentyl glycol 1,2-dimethyl-1,2-cyclopentanediol, 1,2-cyclohexanediol, 1,2-dimethyl-1,2-cyclohexanediol glycerol trimethylol propane, trimethylol ethane 1,2,4-butanetriol, 1,2,6-hexanetriol or mixtures thereof, with such dicarboxylic acids as adipic acid, succinic acid, glutaric acid, azelaic acid sebacic acid malonic acid maleic acid, fumaric acid phthalic acid, isophthalic acid, terephthalic acid, tetrachlorophthalic acid and chlorendic acid; the acid anhydrides and acid halides of these acids may also be used. Preferably, the polyester polyol is prepared from adipic acid and a mixture of 1,4-butane diol or 1,6-hexane diol and neopentyl glycol.

Suitable polyether polyols for use in the preparation of the adhesive composition of the second aspect of the invention include those prepared by polymerizing an alkylene oxide in the presence of a difunctional or trifunctional initiator compound. Examples of such polyols include polyethyleneoxy polyols, polypropyleneoxy polyols, polybutyleneoxy polyols, polytetramethylene ether glycols, and block copolymers of ethylene oxide and propylene oxide. Preferably, the polyether polyol is a polytetramethylene ether glycol, polypropyleneoxy polyol, or a block copolymer of ethylene oxide and propylene oxide, and is most preferably a polypropyleneoxy polyol or a block copolymer of ethylene oxide and propylene oxide.

The equivalent weight of the polyols used to make the compositions of the first and second aspects of the invention is preferably at least about 500, more preferably at least about 800, most preferably at least about 1,000; and is preferably no greater than about 2,000, more preferably no greater than about 1,600, and is most preferably no greater than about 1,500. Preferably, the average hydroxyl functionality of the polyol is at least about 2.0 and no greater than about 3.0 more preferably no greater than about 2.2.

Further, the polyol used to prepare the compositions of the first and second aspects of the invention may also be a mixture of a polyether and polyester polyol. However, in the first aspect of the invention the polyester polyol preferably comprises at least about 50 percent by weight of any mixture of polyols used; likewise, in the second aspect of the invention the polyether polyol preferably comprises at least about 50 percent by weight of any mixture of polyols used. In general, polyether polyols are preferred for use in automotive windshield glass/metal bonding applications, since cured adhesives prepared from such polyols generally have better hydrolytic stability and greater flexibility. Polyester polyols are preferred for use in applications for bonding plastic substrates in automotive applications, since the cured adhesive will have a higher modulus of elasticity, improved load-bearing properties, and improved adhesion to plastic substrates.

Organic diisocyanates suitable for use in the preparation of the adhesive composition of the invention include aromatic, aliphatic and cycloaliphatic diisocyanates and combinations thereof. Representative of these types are m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, diphenylmethane-4,4'-diisocyanate, isophorone diisocyanate, polymethylene polyphenylisocyanate, 3,3'-dimethyl-diphenyl-4,4'-diisocyanate, 4,4'-biphenylene diisocyanate, tetramethylxylene diisocyanate, trimethylhexylene diisocyanate, and bis(4-isocyanato-cyclohexyl)methane ("hydrogenated MDI" or $H_{12}MDI$) and other diisocyanates disclosed in U.S. Pat. No. 4,731,416, column 5, lines 13–37. Preferred diisocyanates are 4,4'-methyldiphenyl diisocyanate, polymethylene polyphenylisocyanate and liquid forms thereof (such as carbodiimide-modified MDI), isophorone diisocyanate, or bis(4-isocyanato-cyclohexyl)methane are preferred, with carbodiimide-modified diphenylmethane-4,4'-diisocyanate ("Liquid MDI", available as Isonate™ 143L from The Do Chemical Company) being most preferred. The isocyanate is preferably employed in an amount, based on the weight of the composition, of at least about 6.5 percent, more preferably at least about 11.3 percent and is preferably no greater than about 33 percent, more preferably no greater than about 22.0 percent; and is most preferably about 20.0 percent.

Hydroquinone bis (2-hydroxyethyl) ether (HQEE) is a well-known compound. The HQEE is employed in an amount, based on the weight of the composition, of at least about 1.0 percent, more preferably at least about 1.8 percent; and is preferably no greater than about 5.2 percent, more preferably no greater than about 2.9 percent, and is most preferably about 2.5 percent.

Components (a), (b), and (c) of the composition of the invention may be combined by any suitable technique, but are preferably combined in a "one-shot" process, wherein the polyisocyanate is combined with the isocyanate-reactive components (a) and (c) in a single step. In other words, no separate step for the preparation of prepolymers from the diisocyanate and component (a) or (c) is required. However, such a separate step may be employed if desired. To achieve a uniform composition, it is convenient to thoroughly mix all of the components of the composition except for the diisocyanate at a temperature of at least about 110° C. prior to adding the diisocyanate. The reactants are preferably combined under anhydrous conditions, since atmospheric moisture may react with the diisocyanate and cause foaming in the reaction mixture.

Components (a), (b), and (c), plus any additional components, are combined in amounts sufficient to provide an isocyanate content in the resulting composition of preferably at least about 0.75 percent, more preferably at least about 1.3 percent; and is preferably no greater than about 3.3 percent more preferably no greater than about 2.2 percent; and is most preferably about 1.6 percent. The ratio of isocyanate groups:isocyanate-reactive groups in the reaction mixture is preferably in the range of from about 1.3:1.0 to about 1.85:1.0, more preferably in the range of from about 1.3:1 to about 1.5:1. Further the "hard segment" content of the composition, based on the weight of the composition, is preferably at least about 2.4 percent, more preferably at least about 4.0 percent, and even more preferably at least about 4.10 percent; and is preferably no greater than about 12 percent, more preferably no greater than about 6.7 percent; and is most preferably about 5.8 percent. The term "hard segment" as used herein, refers to the polymeric units derived from the HQEE and the isocyanate which reacts with both of its hydroxyl groups; it is calculated as the weight of the HQEE plus the weight of 2 moles of isocyanate, for every mole of HQEE.

The average molecular weight per cross-link unit ($M_c$) of the adhesive is preferably in the range of from about 2,500 to about 20,000 in the final composition, after it is cured. The optimum value for $M_c$ will depend on the application, with lower values (such as from about 2,500 to about 2,900) being preferred for automotive plastic bonding applications and higher values (such as from about 12,000 to about 15,000) for automotive glass/metal bonding applications. In general, higher cross-link densities (i.e., $M_c$ less than about 20,000) are preferred since they help to minimize the development of $CO_2$ "bubbles" in the curing adhesive, by reducing the ability of the $CO_2$ to migrate and aggregate within the polymer structure. A method for the calculation of $M_c$ is described in Flory, Paul, "Rubber Elasticity" in *Principles of Polymer Chemistry*, Chap. 11, Cornell Univ. Press, Ithaca, N.Y. (1953).

The composition of the invention also preferably contains a relatively low-equivalent weight polyalkyleneoxy triol to increase the cross-link density (and decrease the $M_c$ value) of the composition. The equivalent weight of such triol is preferably in the range of from about 80 to about 250. The amount of triol employed will depend on the cross-links contributed by the other reactants, but is preferably employed in an amount of from about 0.1 to about 4.0 weight percent, based on the weight of the adhesive. Further, the use of polyols (component (a)) or isocyanates with a higher functionality, or bis-oxazolidines (as described below) will also decrease the $M_c$ of the cured adhesive.

The adhesive may be used to bond substrates by heating the adhesive prior to application and then applying it by any suitable method, but is preferably applied by heating it in an extrusion apparatus which can dispense the adhesive in a molten state such as an applicator "gun" typically used for dispensing and applying hot melt adhesives. The bead may be extruded in any suitable size or shaper at any suitable speed, depending, of course, on the bonding application for which it is employed. After the adhesive is applied, it quickly cools to ambient temperature and provides sufficient tack to bond the substrates with an initial "green strength" before the adhesive cures completely in the presence of atmospheric moisture (or steam). The adhesive should of course, be used in an amount sufficient to provide sufficient green strength to hold the substrates together prior to cure and sufficient adhesive strength after cure.

During the curing process, the free isocyanate groups in the adhesive will react with atmospheric moisture. However, since such reaction releases carbon dioxide and causes foaming in the adhesive, which may reduce the resulting adhesion or affect the mode of failure of the substrate the adhesive composition also preferably comprises at least one additive to reduce such foaming or the likelihood thereof. Preferably, the additive is a bis-oxazolidine compound which ring-opens in the presence of water to form free hydroxyl and amine groups, which will then react with the free isocyanate groups to cure the adhesive without excessive carbon dioxide production. In addition the use of bis-oxazolidine compounds also advantageously accelerates the cure of the adhesive and produces a cured adhesive with a higher cross-link density. Preferably, the bis-oxazolidine compound is a latent aliphatic polyaminoalcohol based on urethane bis-oxazolidine (available from Miles as Hardener OZ™), and is preferably employed in an amount sufficient to provide a stoichiometric amount of isocyanate-reactive groups (upon ring-opening during cure) relative to the amount of isocyanate groups present in the adhesive. Although the weight percent of the bis-oxazolidine compound necessary to provide the desired effect will vary based on the isocyanate content of the adhesive, typically it is employed in an amount of at least about 0.5 percent, based on the weight of the composition.

A catalyst may be included in the reaction mixture to prepare the compositions of this invention. Any of the catalysts known in the art to catalyze the reaction of an isocyanate with a reactive hydrogen may be employed. Representative catalysts include organometallic catalysts such as stannous octoate stannous oleate bismuth octoate, dibutyltin dioctoate, dibutyltin dilaurate, and the like. Catalysts are typically used in amounts ranging from 0 to 10,000 ppm, based on the weight of the adhesive. A preferred catalyst is dibutyltin diacetate (available as Dabco™ T-1 from Air Products and Chemicals) used in the amount of 5 to 100 ppm.

The adhesive compositions of the invention optionally may contain fillers and additives to modify the rheological properties such as viscosity sag resistance and flow rate of the adhesive. Such materials include for example carbon black, surface-treated fumed silicas, titanium dioxide silicas, calcium carbonate, talc mica aluminum oxide, clays ultraviolet stabilizers antioxidants and glass phenolic or aluminum oxide bubbles. When talc mica, or a mixture thereof is used it is preferably used in an amount based on the weight of the adhesive, of from about 1 percent to about 30 percent.

As was mentioned above the adhesive of the invention when cured, has increased resistance to softening at high temperatures (e.g., above about 70° C.). The resistance to softening may be measured by lap shear testing at elevated temperatures, as set forth in the Example section and by an increase in the crystalline melting point ($T_m$, measured by a differential scanning calorimeter operating at a constant rate of temperature rise, and defined as the highest temperature point where a local maximum exists in the measured heat absorbtion spectrum of the polymer) of the hard segment of the adhesive. Preferably the $T_m$ of the composition is at least about 170° C. Differential scanning calorimetry may be conducted on a DuPont 2100 calorimeter using plaques of the adhesive prepared by pouring the adhesive into a 4.5"×8.0" container to make a 0.0725" thick plaque. When solid the adhesive is removed from the container and cured at 23° C. and 50 percent relative humidity. A 10 mg portion of the cured adhesive is then heated in the calorimeter over a profile of −150° C. to 300° C. at an increase of 5° C. per minute.

The adhesive compositions of the invention are useful for bonding any type of substrate but have been discovered to be particularly useful in automotive applications. The composition of the first aspect of the invention which employs a polyester polyol is particularly useful in bonding plastic substrates, such as for bonding plastic bumpers to plastic substrates on the exterior of an automobile. Such adhesives are also useful for bonding applications in the automobile interior, such as bonding carpet, plastic film, or extruded articles. The composition of the second aspect of the invention, which employs a polyether polyol, is particularly useful for applications wherein the adhesive is typically formulated with a large amount of carbon black and other fillers, such as in processes for the bonding of automotive windshields and backlites, wherein a glass substrate is bonded to a metal substrate. Such processes also typically employ silane-based glass wipes glass primers and/or compositions for priming painted metal substrates.

Illustrative Embodiments

The following examples are given to illustrate the invention and should not be interpreted as limiting it in any way. Unless stated otherwise, all parts and percentages are given by weight. The following adhesive compositions may be prepared in a 1-liter glass resin kettle equipped with agitation vacuum, and a heating mantle, unless otherwise noted below. The progress of the reaction may be followed by a suitable titration method to determine isocyanate content, such as ASTM D-2572-91. After the reaction is complete, any catalysts and bis-oxazolidines to be employed are added and the composition is thoroughly mixed.

Lap shear testing is done as follows: The test sample is prepared using 1"×4"×0.125" coupons of Xenoy™ 1102 thermoplastic alloy (GE Plastics) which have been wiped with a clean cloth. The adhesive composition is heated to a temperature in the range of 100°–130° C. The hot adhesive is applied in the form of ⅜" beads across the surface of a coupon. A second coupon is placed on top of the first with a 0.5" overlap and pressed to a final adhesive thickness of 0.03". The samples are then kept in a 50±5 percent relative humidity environment at 23°±2° C. for 14 days. Testing is conducted on an Instron™ machine at a crosshead speed of 0.5 in/min with a 3-inch jaw separation. Peak load at failure and modes of failure are reported. Lap shear testing for a particular temperature is done by heating or cooling the sample to the specified temperature, keeping the sample at such temperature for at least 30 minutes prior to the test and conducting the test at such temperature. The lap shear strengths are reported as the mean of 5 samples± the standard deviation. The following abbreviations are used to designate the mode of failure for the substrate. AF—adhesive failure—the adhesive is pulled cleanly from either side of the substrate coupon. CF—cohesive failure—the bond failed in the adhesive portion, leaving adhesive on both substrate coupons. Cohesive failure is generally the preferred mode of failure since it generally results in more consistent lap shear values from sample to sample.

EXAMPLE 1

A composition is prepared by reacting 67.2 parts by weight of a 2,000 molecular weight polyester diol (linear poly(1,4-butanediol neopentyl glycol adipate), available as Lexorez™ 1640-55 from Inolex Chemical Company) 0.5 parts by weight of a 267 molecular weight trimethylol propane-initiated triol (Voranol™ 234–630, available from The Dow Chemical Company), 3.4 parts by weight of HQEE 10.0 parts by weight dry talc filler and 10 ppm dibutyltin dilaurate with 19.0 parts by weight 4,4'-diphenylmethane diisocyanate. The resulting composition has an isocyanate content of about 1.9 percent. The composition is packaged while in its molten state into a container (such as a cartridge tube) and sealed to exclude air and moisture.

EXAMPLE 2

A composition is prepared by reacting 39.8 parts by weight of a 2,000 molecular weight polyester diol (linear poly (1,4-butanediol neopentyl glycol adipate) 27.2 parts by weight of a 2,000 molecular weight poly(propylene oxide) diol capped with ethylene oxide (Voranol™ 222–056, available from The Dow Chemical Company) 0.7 parts by weight of a 267 molecular weight trimethylol propane-initiated triol (Voranol™ 234–630, available from The Dow Chemical Company) 3.4 parts by weight of HQEE 10.0 parts by weight dry talc filler and 15 ppm dibutyltin dilaurate with 19.0 parts by weight 4,4'-diphenylmethane diisocyanate. The resulting composition has an isocyanate content of about 1.8 percent. The composition is packaged while in its molten state into a container (such as a cartridge tube) and sealed to exclude air and moisture.

EXAMPLE 3

Testing of Adhesive Properties

The adhesive compositions of Example 1 and 2 are tested according to the above method at the following temperatures to obtain the following results:

| Example No. | Test Temperature | Lap Shear Strength, psi | Mode of Failure |
| --- | --- | --- | --- |
| 1 | 23 ± 2° C. | 1269 | 58% CF/ 42% AF |
| 1 | 88 ± 2° C. | 426 | 98% CF/ 2% AF |
| 2 | 23 ± 2° C. | 859 | 67% CF/ 33% AF |
| 2 | 88 ± 2° C. | 409 | 89% CF/ 11% AF |

EXAMPLE 4

A 3,000 molecular weight polyoxypropylene diol (available as Voranol™ 220–037 from The Dow Chemical Company; 265.4 g) a 4,500 molecular weight polyoxypropylene-polyoxyethylene block copolymer triol (available as Voranol™ 232–036N from The Dow Chemical Company; 256.9 g) HQEE (16.634 g (2.38 percent by weight) talc (2μavg. diameter 70 g) and an effective amount of stannous octoate (catalyst) are charged to a reactor. The mixture is heated to 110° C. and stirred under vacuum for 1 hour to disperse the filler and dehydrate and degas the mixture and then is allowed to cool with stirring to 70° C. Molten diphenylmethane-4,4'-diisocyanate (91.1 grams NCO/OH= 1.44, available as Isonate™ 125M from The Dow Chemical Company) is added to the mixture and the temperature of the reaction mixture is raised to 141° C. over a period of 39 minutes as the reaction progresses. The composition is then packaged while in its molten state into a container (such as a cartridge tube) and sealed to exclude air and moisture. The isocyanate content of the product is 1.36 percent.

The adhesive is dispensed for evaluation at 95° C. and a sample is cured as a sheet in the atmosphere at 23° C. over a period of 15 days. A small sample of the cured adhesive is evaluated on a Differential Scanning Calorimeter from −120° C. to +300° C. It shows a Tg at −56° C. and a melt transition at 187° C. 1" coupons of primed automotive glass and primed automotive steel are bonded together with the adhesive and allowed to cure at ambient conditions for 2 weeks. The bond strength averages 480 psi and the failure occurs in the adhesive layer.

EXAMPLE 5

The following formulations are prepared using the following procedure: The polyol(s) and HQEE are thoroughly mixed under reduced pressure at a temperature of about 110° C. Any fillers used are pre-dried and added to the kettle and mixed until they are fully dispersed, while maintaining the temperature and reduced pressure. The mixture is then cooled to 70° C. and the diisocyanate is then added and mixed with the reactants under reduced pressure. After the reaction is completer any catalysts and bis-oxazolidines to be employed are added and the composition is thoroughly mixed. Lap shear samples are then prepared and tested as set forth above.

| Component (Wt %) | Ex. 5A | Ex. 5B | Ex. 5C | Ex. 5D | Ex. 5E | Ex. 5F |
| --- | --- | --- | --- | --- | --- | --- |
| Lexorez ™ 1640-55 | 61.41 | 60.80 | 58.07 | 57.46 | 60.42 | 56.09 |
| Voranol ™ 234–630 | | 0.28 | | 0.27 | | 0.26 |
| HQEE | 2.94 | 2.91 | 2.78 | 2.75 | 2.89 | 2.65 |
| Talc | 20.00 | | 20.00 | 20.00 | 20.00 | 20.00 |
| Graphite | | 20.00 | | | | |
| Isonate 125M | 15.65 | 16.00 | 14.80 | 15.12 | | 16.33 |
| Isonate 143L | | | | | 16.69 | |
| Dabco T-1 | 0.00075 | 0.00075 | 0.00075 | 0.00075 | 0.00075 | 0.00094 |
| Hardener OZ | | | | | | 4.68 |
| 23° C. Lap Shear, psi (Failure mode) | 1182 ± 41 (98% CF; 2% AF) | 1297 ± 121 (100% CF) | 853 ± 29 (100% CF) | 969 ± 62 (100% CF) | 1219 ± 69 (100% CF) | 1030 ± 76 (100% CF) |
| 88° C. Lap Shear, psi (Failure mode) | 259 ± 12 (100% CF) | 366 ± 14 (100% CF) | 234 ± 8 (100% CF) | 283 ± 9 (100% CF) | 363 ± 8 (100% CF) | 294 ± 25 (100% CF) |
| $M_c$ | ∞ (no x-links) | 76,000 | 4,800 | 4,500 | 14,000 | 3,100 |

| Component (Wt. %) | Ex. 5G | Ex. 5H | Ex. 5I | Ex. 5J | Ex. 5K | Ex. 5L |
| --- | --- | --- | --- | --- | --- | --- |
| Lexorez ™ 1640-55 | 52.23 | 51.67 | 53.79 | 53.29 | 47.27 | 51.95 |
| Voranol ™ 234–630 | | 0.24 | 0.24 | 0.26 | 0.24 | 0.24 |
| HQEE | 2.47 | 2.48 | 2.48 | 2.71 | 2.48 | 2.49 |
| Talc | 25.00 | 25.00 | 12.50 | 12.50 | 30.00 | 25.00 |
| Graphite | | | 10.00 | 10.00 | | |
| Isonate 143L | 15.63 | 15.94 | 16.26 | 16.52 | 15.34 | 15.62 |
| Dabco T-1 | 0.00099 | 0.00099 | 0.00106 | 0.00106 | 0.00099 | 0.00094 |
| Hardener OZ | 4.66 | 4.68 | 4.69 | 4.69 | 4.68 | 4.70 |
| 23° C. Lap Shear, psi (Failure mode) | 872 ± 23 (100% CF) | 961 ± 36 (100% CF) | 1057 ± 54 (100% CF) | 1008 ± 39 (100% CF) | 839 ± 83 (100% CF) | 878 ± 34 (100% CF) |
| 88° C. Lap Shear, psi (Failure mode) | 261 ± 16 (100% CF) | 292 ± 12 (100% CF) | 341 ± 13 (100% CF) | 365 ± 24 (100% CF) | 283 ± 6 (100% CF) | 259 ± 16 (100% CF) |
| $M_c$ | 3,100 | 2,925 | 3,000 | 2,982 | 2,753 | 2,926 |

What is claimed is:

1. A one-part hot melt adhesive comprising the reaction product of:

(a) a polyester polyol or a mixture of a polyester polyol and a polyether polyol, having equivalent weights in the range of from about 250 to about 3,000;

(b) a polyisocyanate; and (c) at least about 1 weight percent hydroquinone bis (2-hydroxyethyl) ether based on the weight of the adhesive;

wherein the isocyanate content of the resulting product is at least about 0.5 percent based on the weight of the adhesive and component (a) comprises at least 50 percent by weight of the polyester polyol.

2. The adhesive of claim 1 wherein the polyether polyol is a block copolymer of ethylene oxide and propylene oxide.

3. The adhesive of claim 1 wherein the equivalent weight of the polyether polyol is in the range of from about 1,000 to about 1,600.

4. The adhesive of claim 1 wherein the polyisocyanate is diphenylmethane-4,4'-diisocyanate or carbodiimide-modified diphenylmethane-4,4'-diisocyanate.

5. The adhesive of claim 1 wherein the hydroquinone bis (2-hydroxyethyl) ether is present in an amount of from about 1.0 to about 5.2 percent by weight based on the weight of the adhesive.

6. The adhesive of claim 5 wherein the hydroquinone bis (2-hydroxyethyl) ether is present in an amount in the range of from about 1.8 percent to about 2.9 percent based on the weight of the adhesive.

7. The adhesive of claim 1 which is prepared by combining the polyisocyanate with the isocyanate-reactive components (a) and (c) in a one-shot process.

8. The adhesive of claim 1 which has an isocyanate content of at least about 1.3 percent based on the weight of the adhesive.

9. The adhesive of claim 1 wherein the ratio of isocyanate groups:isocyanate-reactive groups in the reaction mixture is in the range of from about 1.3:1.0 to about 1.85:1.0.

10. The adhesive of claim 1 which has a hard segment content based on the weight of the adhesive, of at least about 4.0 percent.

11. The adhesive of claim 1 which has an $M_c$ value in the range of from about 2,500 to about 20,000.

12. The adhesive of claim 1 which further comprises a bis-oxazolidine compound, which is present in an amount of at least about 0.5 percent based on the weight of the adhesive.

13. A one-pan hot melt adhesive comprising the reaction product of:

(a) a polyether polyol having an equivalent weight in the range of from about 250 to about 3,000 and a polyester polyol having an equivalent weight in the range of from about 800 to about 1,600;

(b) a polyisocyanate; and (c) at least about 1 weight percent hydroquinone bis (2-hydroxyethyl) ether based on the weight of the adhesive;

wherein the isocyanate content of the resulting product is at least about 0.5 percent based on the weight of the adhesive and component (a) comprises at least 50 percent by weight of the polyether polyol.

14. A one-part hot melt adhesive comprising the reaction product of:

(a) a polyether polyol, a polyester polyol, or a mixture thereof, having equivalent weights in the range of from greater than 250 to about 3,000;

(b) a polyisocyanate;

(c) at least about 1 weight percent hydroquinone bis (2-hydroxyethyl) ether based on the weight of the adhesive; and (d) from about 0.1 to about 4.0 weight percent based on the weight of the adhesive of a polyoxyalkylene triol having an equivalent weight from about 80 to 250;

wherein the isocyanate content of the resulting product is at least about 0.5 percent based on the weight of the adhesive and the adhesive has an Mc value of from about 2,500 to about 20,000.

15. The adhesive of claim 14 wherein the equivalent weight of the polyol of component (a) is in the range of from about 500 to 2,000.

* * * * *